April 8, 1930.　　　　　F. H. BEST　　　　　1,753,230

METER

Filed Feb. 25, 1928

INVENTOR
F. H. Best
BY
ATTORNEY

Patented Apr. 8, 1930

1,753,230

UNITED STATES PATENT OFFICE

FRED H. BEST, OF WESTFIELD, NEW JERSEY, ASSIGNOR TO AMERICAN TELEPHONE AND TELEGRAPH COMPANY, A CORPORATION OF NEW YORK

METER

Application filed February 25, 1928. Serial No. 257,018.

This invention relates to electric meters, and more particularly to meters of the direct current type which are adapted for transmission testing.

The general type of electric meter which is suitable for use in direct current work is also commonly used in transmission testing work. This type of meter is of such construction that the deflection of its pointer is proportional to the current through the moving coil of the meter.

When this type of instrument is used to indicate the current through a heater of a thermocouple or the current in the output of a rectifier, the deflection of the pointer of the meter is proportional to the square of the applied current. This results in a scale which is crowded near the zero point and greatly spread out near maximum deflection. If the scale of such meter is calibrated in transmission units rather than actual current, a similar scale results, and the units at the upper end of the scale are many times larger than those at the lower.

In transmission testing work it is common practice to employ a detector or rectifier and a direct current meter for measuring alternating current. When transmission measurements are made with this combination, calibrating the scale in transmission units gives a scale similar to that referred to above, as obtained with a thermocouple or rectifier.

The characteristics of the circuits previously used to obtain a uniform transmission unit scale with ordinary meters are such that they are unsuitable for certain types of measurements. It has therefore been desirable to design a meter in which the resulting scale for measuring transmission units will give uniform divisions when the meter is used with a detector or rectifier.

It is an object of this invention to provide a test meter in which the scale for indicating the value of units, such as transmission units, will have uniform divisions or graduations throughout.

This, and further objects will be apparent from the following description, when considered in connection with the accompanying drawing, in which one embodiment of the invention is illustrated.

Figure 1:
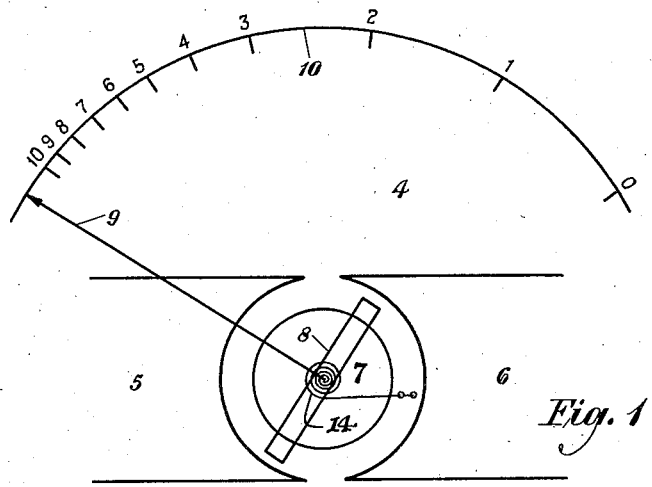
Figure 2:
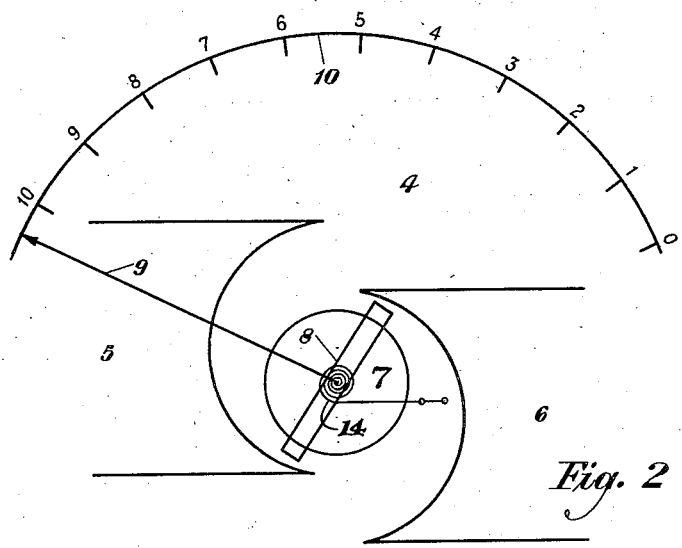
Figure 3:

Referring to the drawing, Figure 1 indicates diagrammatically a well-known type of direct current meter; Fig. 2 is a diagrammatic representation embodying the principles of the improved device; and Fig. 3 is a diagram with which said device is adapted to be used.

In the drawing, such parts of the improved meter 4 are shown as are essential to a full understanding of the invention. The numerals 5 and 6 designate pole pieces which are positioned on either side of a stationary iron core or cylinder 7. These pole pieces may be of the usual soft iron composition and are associated with a permanent magnet (not shown) of well-known construction. A coil 8, of the usual character, provided with windings through which flows current to be measured, is pivoted so as to rotate in the air gap between the pole pieces and the cylinder 7. The coil when moved from its normal position tends to be returned to normal by a spiral spring 14, which exerts a restoring force directly proportional to the magnitude of displacement of the coil.

Fig. 1 shows a common type of direct current meter, and one which is in general use. In this form of meter effort is made to obtain a uniform flux distribution in the air gap between the pole pieces and the iron cylinder so that, with the type of restoring spring above referred to, the deflection of the moving coil will be proportional to the current flowing through it. When such a meter measures the current in the output of a translating device, such as a detector, rectifier, thermocouple or the like, and it is desired to have the scale read in units proportional to the input current, or to the transmission loss (or gain) of which the input current is a measure, the scale will not have uniform graduations due to the square relation that exists between the input and output currents, and due to the indirect relation that exists between the transmission unit and current. The graduation of the scale for this type of meter, as indicated in Fig. 1, is approximately what is obtained when it is used with a detector to measure transmission. The figures used in connection with the graduations indicate transmission units. With this form of scale great accuracy cannot be obtained between the values 5 and 10 of the transmission units, and the accuracy between the values 0 and 3 transmission units is much greater than necessary.

A distorted scale results as above described, arising due to the fact that an instrument which measures current is being used to measure transmission loss (or gain), when, as a matter of fact, the transmission unit is not proportional to the current. The transmission to be measured is the ratio of the energy received at the distant end of the circuit to that applied at the transmitting end so that we have a known amount of applied energy and measurement of the received current as an indication of the amount of energy received, and, from this, the ratio may at once be obtained. The unit which is used in meauring the magnitude of this ratio is, however, of such a character that a direct relation does not exist between the received current and the transmission. For example, let us assume a circuit in which there is no transmission loss so that all the energy applied is received at the receiving end. Now, due to the nature of the transmission unit, if we introduce a transmission loss equal to a certain number of transmission units, say X-transmission units, the received current will be one-half what it was before. If, now, we add X-additional units of transmission loss, so that the total loss will be 2X, the transmission is again halved so that it is one-quarter of its original value. If X-additional units of transmission loss be now added to the circuit, making a total of 3X, the current will be one-eighth of its original value. Thus, it will be seen that though the transmission loss is increased by successive, equal increments, the received current is decreased in such a manner that each time its value is one-half what it was previously and, although it approaches zero, never actually becomes zero. It is this indirect relationship between the received current and the transmission equivalent of the circuit that results in the distorted scale above described, and, which it is desired to overcome by the present invention.

In the improved arrangement indicated in Fig. 2, the objections outlined above in connection with Fig. 1 are remedied. In Fig. 2, the scale 10 is calibrated in uniform divisions throughout, and these are arranged along an arc subtending the angle of movement of the moving coil, the air gap between the curved pole pieces 5 and 6 and the cylinder 7 is not constant, but increases as the member 8 rotates and the deflection of the pointer 9 increases. The pole pieces 5 and 6 may be eccentrically related to the cylinder and may be positioned in different horizontal planes, so that the pole piece 5 will be elevated with respect to its companion pole piece 6. The arrangement of said pole pieces thus provides a variable air gap between the pole pieces 5 and 6 and the cylinder 7. This arrangement between the pole pieces and cylinder has the effect of weakening the magnetic flux density in the air gap, and thus a much greater current is required through the moving coil 8 to produce a given deflection of the pointer 9 at the upper part of the scale than is required at the lower part of the scale. It will be obvious that a meter of this construction requires a larger operating current to produce a full scale deflection than is required for the meter shown in Fig. 1. Although the pole pieces 5 and 6 are shown in eccentric relation, similar results can be obtained with the arrangements shown in Fig. 1, provided the pole pieces are so shaped that the air gap increases with the movement of the movable coil 8. By means of the foregoing arrangement, the variation in the field from point to point, as the indicator moves, is of such character as to compensate for the indirect relation that exists between the received current and the transmission loss (or gain) of which the current is a measure. It may also compensate for the indirect relation which exists between the rectified current which actuates the meter and the received alternating current which is really to be measured and from which the rectified current is derived.

The diagram shown in Fig. 3 illustrates the connection of the meter 4 in a circuit with which it is adapted to be used. The input side of the circuit consists of a source of alternating current 12, which is transmitted over a circuit 15 and the received current applied to a rectifying device 13. The rectifying device may be of any suitable character, such as a detector, rectifier, thermocouple or the like. The output side of the circuit consists of a meter 4 of the character above outlined, which is connected by a pair of conductors to the rectifying device 13. The alternating current which is received from a transmission circuit whose transmission is to be measured passes through the rectifying device 13 and is rectified thereby into direct current in a well understood manner. The rectified or direct current flows through the meter 4 which indicates, by the improved structure above described, the amount of current corresponding to the alternating current flowing from the source 12. The reading on the scale in Fig. 2 will then be a reading of the transmission loss (or gain) of the circuit 15.

What is claimed is:

1. A meter having a movable coil through which flows a current to be measured, a pointer associated with the coil, a scale having uniform graduations throughout corresponding to transmission units which are logarithmic functions of the current to be measured, said scale being arranged along arcs subtending the angle of movement of said coil, and pole pieces positioned up either side of the coil, said pole pieces being so arranged with respect to the coil and being so shaped as to provide an air gap through which the coil moves and which air gap varies in such a manner that the pointer will move a substantially uniform distance at any part of the scale in response to a change in current corresponding to a transmission unit.

2. A system for measuring the transmission equivalent of an alternating current circuit, comprising, a source of alternating current, a circuit whose transmission is to be measured and through which current from said source is transmitted, means to rectify the alternating current received from such circuit after transmission thereover, and a meter to which rectified current is applied, said meter comprising a coil through which the received current flows, a pointer associated with the coil, a scale having uniform graduations throughout corresponding to transmission units which are logarithmic functions of the alternating current received by said rectifier, said scale being arranged along arcs subtending the angle of movement of said coil, and curved pole pieces positioned on either side of the coil and shaped to provide a flux density which varies in such a manner that the coil and pointer will move a substantially equal distance at any part of its range in response to a change in current corresponding to a transmission unit.

In testimony whereof, I have signed my name to this specification this 24th day of February, 1928.

FRED H. BEST.